(12) United States Patent
Shirokov

(10) Patent No.: US 10,978,975 B2
(45) Date of Patent: Apr. 13, 2021

(54) FAULT-TOLERANT ELECTRICAL DRIVE

(71) Applicant: ROLLS-ROYCE plc, London (GB)

(72) Inventor: Vladimir A Shirokov, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 16/908,960

(22) Filed: Jun. 23, 2020

(65) Prior Publication Data

US 2021/0021217 A1 Jan. 21, 2021

(30) Foreign Application Priority Data

Jul. 17, 2019 (GB) ...................................... 1910223

(51) Int. Cl.
| | | |
|---|---|---|
| *H02P 9/02* | (2006.01) | |
| *H02P 25/22* | (2006.01) | |
| *H02H 7/08* | (2006.01) | |
| *H02P 29/024* | (2016.01) | |

(52) U.S. Cl.
CPC ............. *H02P 9/02* (2013.01); *H02H 7/0805* (2013.01); *H02H 7/0833* (2013.01); *H02P 25/22* (2013.01); *H02P 29/0243* (2016.02); *B64D 2221/00* (2013.01)

(58) Field of Classification Search
CPC ........ H02P 9/02; H02P 29/0243; H02P 25/22; H02H 7/0805; H02H 7/0833; B64D 2221/00
USPC ................... 322/17; 290/44; 307/64; 361/20
See application file for complete search history.

(56) References Cited

U.S. PATENT DOCUMENTS

| | | | |
|---|---|---|---|
| 5,491,622 A | 2/1996 | Carosa | |
| 7,944,068 B2* | 5/2011 | Wagoner | H02H 7/1216 290/44 |
| 9,548,605 B2* | 1/2017 | Lewis | H02H 7/06 |
| 9,899,868 B2* | 2/2018 | Bundschuh | H02J 3/382 |
| 10,693,408 B2* | 6/2020 | Obry | H02P 27/06 |
| 2009/0322083 A1* | 12/2009 | Wagoner | H02J 3/38 290/44 |

(Continued)

FOREIGN PATENT DOCUMENTS

| | | |
|---|---|---|
| EP | 3487029 A1 | 5/2019 |
| WO | 2018/180238 A1 | 10/2018 |

OTHER PUBLICATIONS

Nov. 9, 2020 Extended European Search Report issued in European Patent Application No. 20180593.4.

(Continued)

*Primary Examiner* — Pedro J Cuevas
(74) *Attorney, Agent, or Firm* — Oliff PLC

(57) ABSTRACT

Fault-tolerant electrical drive systems and methods of maintaining electrical balance or continuing operation of a rotary electric machine under a fault condition are provided. One such system comprises: a rotary electric machine comprising pn phases having a common connection point, where p is a prime number and n is an integer greater than or equal to 1; a drive circuit module having pn phase drive circuits and a reserve drive circuit; and a contactor module. The contactor module comprises: pn phase contactors each of which is operable to connect one of the pn phases of the rotary electric machine to a respective one of the pn phase drive circuits; and a phase fault contactor operable to connect the reserve drive circuit to the common connection point.

10 Claims, 5 Drawing Sheets

(56) References Cited

U.S. PATENT DOCUMENTS

| | | | |
|---|---|---|---|
| 2013/0194704 A1* | 8/2013 | Lewis | H02H 7/06 |
| | | | 361/20 |
| 2016/0134212 A1 | 5/2016 | Kikuchi et al. | |
| 2016/0197517 A1* | 7/2016 | Bundschuh | H02J 9/06 |
| | | | 307/64 |
| 2017/0229993 A1* | 8/2017 | Obry | H02P 25/18 |
| 2018/0337590 A1 | 11/2018 | He et al. | |

OTHER PUBLICATIONS

Search Report of the Intellectual Property Office of the United Kingdom for GB1910223.5 with search date of Jan. 14, 2020.

* cited by examiner

FAULT-TOLERANT ELECTRICAL DRIVE

CROSS-REFERENCE TO RELATED APPLICATIONS

This specification is based upon and claims the benefit of priority from UK Patent Application Number 1910223.5 filed on 17 Jul. 2019, the entire contents of which are incorporated by reference.

TECHNICAL FIELD

This disclosure concerns a fault-tolerant electrical drive system and a method of maintaining electrical balance or continuing operation of a rotary electric machine under a fault condition.

BACKGROUND

It is a requirement in some applications of electrical drive systems to provide fault-tolerance. Some strategies are well-established; however they often involve simple duplexing of systems. It is therefore desirable to provide an improved fault-tolerant electrical drive system.

SUMMARY

According to a first aspect there is provided a fault-tolerant electric drive system comprising:
a rotary electric machine comprising pn phases having a common connection point, where p is a prime number and n is an integer greater than or equal to 1;
a drive circuit module having pn phase drive circuits and a reserve drive circuit; and
a contactor module comprising:
pn phase contactors each of which is operable to connect one of the pn phases of the rotary electric machine to a respective one of the pn phase drive circuits; and
a phase fault contactor operable to connect the reserve drive circuit to the common connection point,
the contactor module being configured in a normal operational mode to close each of the pn phase contactors to connect each of the pn phases to a respective one of the pn phase drive circuits,
wherein, in a phase fault mode, in response to a fault in one of the pn phases, hereinafter the faulted phase, the contactor module is configured to open one of the pn phase contactors between the faulted phase and a respective one of the phase drive circuits and to close the phase fault contactor to allow continued operation of the electric drive system.

The fault-tolerant electric drive system is capable of continuing operation if one of the phases in the rotary electric machine fails, making the system tolerant to such a fault. Following a fault, the reserve drive circuit can be driven to simulate the normal behaviour of the disconnected faulted phase so that the electric drive system can continue operation.

The contactor module may further comprise pn drive circuit fault contactors operable to connect the reserve drive circuit to a respective one of the pn phases, wherein in a drive circuit fault mode in response to a fault of one of the pn phase drive circuits, hereinafter the faulted phase drive circuit, the contactor module is configured to open one of the pn phase contactors between the faulted phase drive circuit and a respective one of the phases and to close one of the pn drive circuit fault contactors to connect the reserve drive circuit to the respective one of the phases to allow continued operation of the electric drive system.

The fault-tolerant electric drive system may thereby be also capable of continuing operation if one of the phase drive circuits fails by switching to the reserve drive circuit, allowing operation to continue at full capacity.

According to a second aspect there is provided a fault-tolerant electric drive system comprising:
a rotary electric machine comprising pn phases having a common connection point, where p is a prime number and n is an integer greater than or equal to 1;
a drive circuit module having pn phase drive circuits and a reserve drive circuit; and
a contactor module comprising:
pn phase contactors each of which is operable to connect one of the pn phases to a respective one of the pn phase drive circuits; and
pn drive circuit fault contactors operable to connect the reserve drive circuit to a respective one of the pn phases,
the contactor module being configured in a normal operational mode to close each of the pn phase contactors to connect each of the pn phases to a respective one of the pn phase drive circuits and to open each of the pn drive circuit fault contactors,
wherein in a drive circuit fault mode in response to a fault of one of the pn phase drive circuits, hereinafter the faulted phase drive circuit, the contactor module is configured to open one of the pn phase contactors between the faulted phase drive circuit and a respective one of the phases and to close one of the pn drive circuit fault contactors to connect the reserve drive circuit to the respective one of the phases to allow continued operation of the electric drive system.

According to this alternative aspect therefore, the system is configured to continue operation in the event of one of the phase drive circuits failing, and operation may continue with the reserve drive circuit, enabling continued operation at full capacity.

The contactor module may additionally comprise a phase fault contactor operable to connect the reserve drive circuit to the common connection point, wherein, in a phase fault mode, in response to a fault of one of the pn phases, hereinafter the faulted phase, the contactor module is configured to open one of the pn phase contactors between the faulted phase and a respective one of the phase drive circuits and to close the phase fault contactor to allow continued operation of the electric drive system.

The fault-tolerant electric drive system according to the first aspect may further comprise a controller configured to:
in a normal mode, operate the drive circuit module to cause the pn phase drive circuits to drive operation of the rotary electric machine while the pn phase contactors connect the pn phases of the rotary electric machine to respective ones of the pn phase drive circuits;
monitor the pn phases of the rotary electric machine for a fault; and
in response to detecting a fault in one of the pn phases, hereinafter the faulted phase, operate the drive circuit module in the phase fault mode in which one of the pn phase contactors between the faulted phase and a respective one of the phase drive circuits is opened and the phase fault contactor is closed.

The fault-tolerant electric drive system according to the second aspect may further comprise a controller configured to:
in a normal mode, operate the drive circuit module to cause the pn phase drive circuits to drive operation of the rotary electric machine while the pn phase contactors connect the pn phases of the rotary electric machine to respective ones of the pn phase drive circuits;

monitor the pn phase drive circuits of the drive circuit module for a fault; and in response to detecting a fault in one of the pn phase drive circuits, hereinafter the faulted phase drive circuit, operate the drive circuit module in the drive circuit fault mode in which one of the pn phase contactors between the faulted phase drive circuit and a respective one of the phases is opened and one of the pn drive circuit fault contactors is closed to connect the reserve drive circuit to the respective one of the phases.

In the fault-tolerant electric drive system according to the first or second aspect, the drive circuit module may be connected between a first pair of power supply rails. In some examples, the drive circuit module may be switchable between the first pair of power supply rails and a second pair of power supply rails.

According to a third aspect there is provided a method of operating a fault-tolerant electric drive system according to the first aspect, the method comprising:

in a normal mode, operating the drive circuit module to cause the pn phase drive circuits to drive operation of the rotary electric machine while the pn phase contactors connect the pn phases of the rotary electric machine to respective ones of the pn phase drive circuits;

monitoring the pn phases of the rotary electric machine for a fault; and in response to detecting a fault in one of the pn phases, hereinafter the faulted phase, operating the drive circuit module in a phase fault mode in which one of the pn phase contactors between the faulted phase and a respective one of the phase drive circuits is opened and the phase fault contactor is closed.

According to a fourth aspect there is provided a method of operating a fault-tolerant electric drive system according to the second aspect, the method comprising:

in a normal mode, operating the drive circuit module to cause the pn phase drive circuits to drive operation of the rotary electric machine while the pn phase contactors connect the pn phases of the rotary electric machine to respective ones of the pn phase drive circuits;

monitoring the pn phase drive circuits of the drive circuit module for a fault; and in response to detecting a fault in one of the pn phase drive circuits, hereinafter the faulted phase drive circuit, operating the drive circuit module in a drive circuit fault mode in which one of the pn phase contactors between the faulted phase drive circuit and a respective one of the phases is opened and one of the pn drive circuit fault contactors is closed to connect the reserve drive circuit to the respective one of the phases.

According to a fifth aspect there is provided a controller for a fault-tolerant electric drive system, the controller configured to perform the method according to the third and/or fourth aspects.

According to a sixth aspect there is provided a computer program comprising instructions for instructing a computerised controller for a fault-tolerant electric drive system to perform the method according to the third and/or fourth aspects. The computer program may be stored on a non-transitory storage medium.

In each of the aspects, the prime number p may for example be 2, 3, 5 or 7. The integer n may for example be 1, 2, 3, 4 or 5. In a particular exemplary embodiment disclosed herein, p is 3 and n is 2.

The invention according to any of the aspects may be applied to any electrical machine employing an electronic controller to control an AC electrical field in the stator of the electrical machine. A particular example of such an electrical machine is a permanent magnet (PM) synchronous machine, which may be operated as a motor or as a generator.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
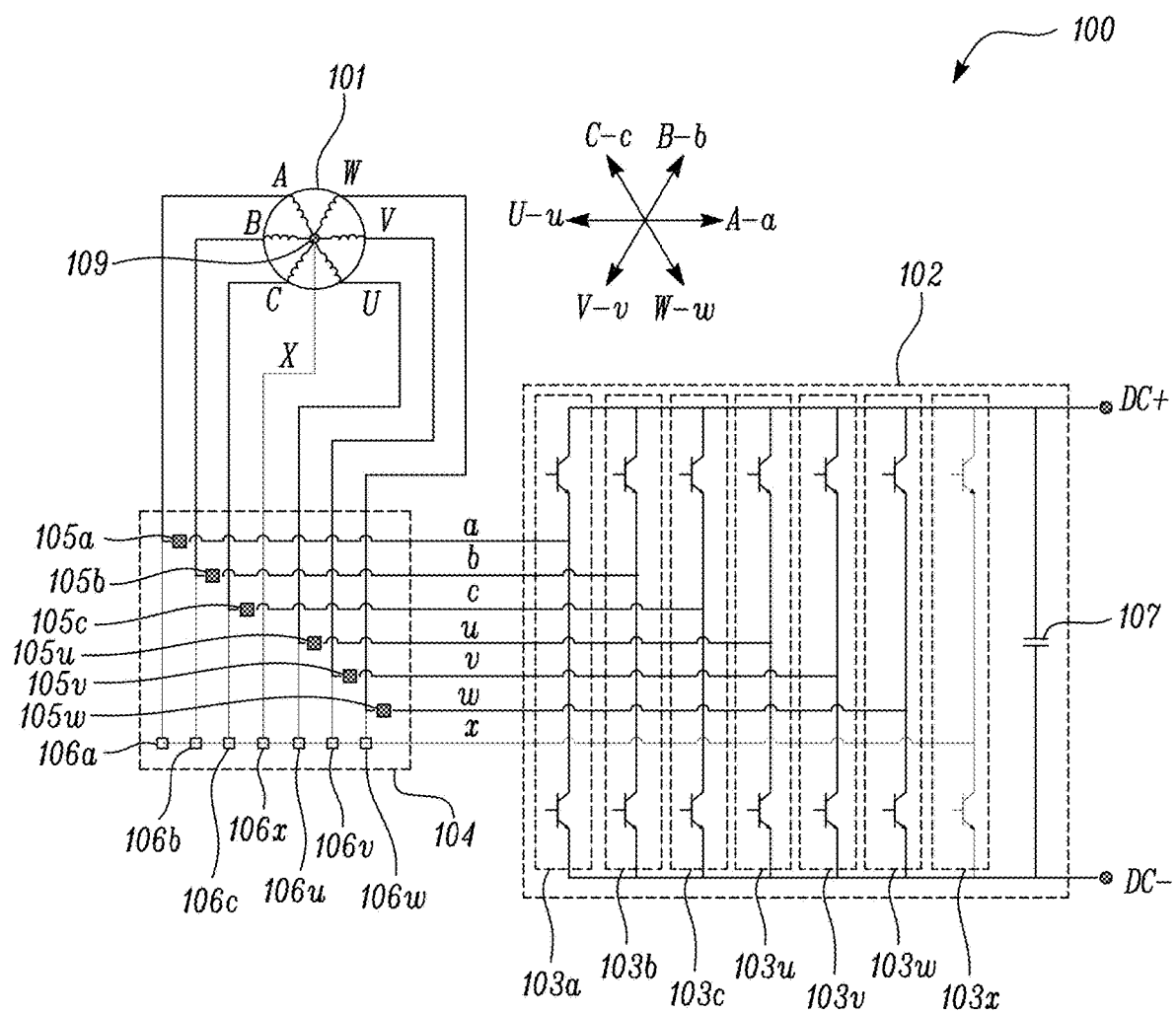
FIG. 1 is a schematic circuit diagram of an example fault-tolerant electric drive system operating in a normal (i.e. fault-free) mode.

Referring to FIG. 1, an example fault-tolerant drive system 100 comprises a rotary electric machine 101, such as an electric motor or generator, connected to a drive circuit module 102. The electric machine 101 comprises six phases A, B, C, U, V, W arranged in a star configuration, i.e. with the phases having a common connection point 109. In other examples the system 100 may have fewer or greater than six phases. In general, the number of phases may be expressed as pn, where n is an integer greater than or equal to one and p is a prime number. Increasing the value of n allows the electric machine 101 to exhibit a reduced torque derating under fault conditions, but at the expense of increased complexity. A trade-off is therefore usually necessary.

The drive circuit module 102 comprises six (i.e. pn, where n=2 and p=3) phase drive circuits 103a-c, 103u-w, each of which is connectable to a corresponding phase of the rotary electric machine 101. An additional reserve drive circuit 103x is provided to enable operation of the electric drive system during a fault mode, the operation of which is described below. Each of the drive circuits 103a-c, 103u-w, 103x comprises a pair of semiconductor switches, which may for example be high power MOSFET transistor switches, connected across a pair of power supply lines DC+, DC−. A smoothing capacitor 107 may also be connected between the power supply lines DC+, DC−. The drive circuit module 102 may comprise a different architecture, the example shown in FIG. 1 comprising a simple drive circuit architecture.

A contactor module 104 enables connections between the drive circuit module 102 and the rotary electric machine 101 to be configured according to the required mode of operation. In a normal mode of operation, the arrangement for which is illustrated in FIG. 1, contactors 105a-c, 105u-w of the contactor module 104 are closed (indicated by filled boxes), connecting phase drive circuits 103a-c, 103u-w to corresponding phases A, B, C, U, V, W of the rotary electric machine 101. With the rotary electric machine 101 operating as a motor, the phase drive circuits 103a-c, 103u-w are operated by a sequence of switching operations to drive the phases A, B, C, U, V, W in sequence and thereby cause a rotor (not shown) to rotate. In such a normal mode of operation, the reserve drive circuit 103x is not used and current flows only through phases A, B, C, U, V, W.

The contactor module 104 further comprises a phase fault contactor 106x and six (i.e. pn, where n=2 and p=3) drive circuit fault contactors 106a-c, 106u-w. During normal operation, these are all open (indicated by unfilled boxes). In the event of a failure of one of the phases of the rotary electric machine 101, the phase fault contactor 106x is operable to connect the reserve drive circuit 103x to the common connection point X. In the event of a failure of one of the phase drive circuits 103a-c, 103u-w, the drive circuit fault contactors 106a-c, 106u-w are operable to connect the reserve drive circuit 103x to any selected one of the phases A, B, C, U, V, W to take the place of the failed drive circuit. Either or both of the phase fault contactor 106x and the drive circuit fault contactors 106a-c, 106u-w may be present in an embodiment.

Each of the contactors 105a-c, 105u-w, 106a-c, 106u-w, 106x may be mechanical or semiconductor contactors.

Figure 2:
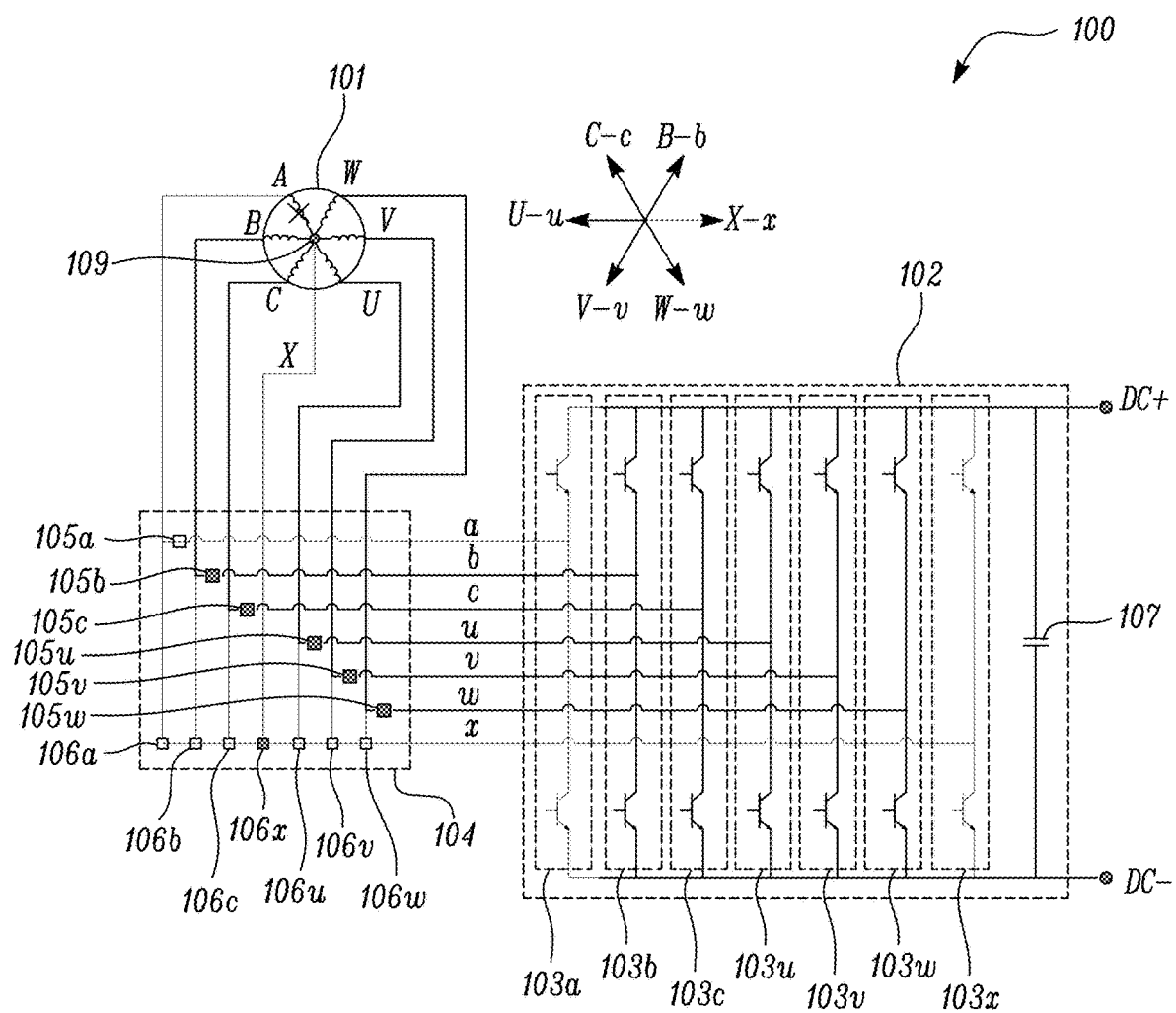
FIG. 2 is a schematic circuit diagram of the electric drive system of FIG. 1 operating in a phase fault mode.

FIG. 2 illustrates the electric drive system 100 in a phase fault mode, in which phase A of the rotary electric machine 101 has failed. Phase contactor 105a is opened to disconnect phase drive circuit 103a from the failed phase A. Phase fault contactor 106x is closed to connect reserve drive circuit 103x to the common connection point 109. The reserve drive circuit 103x can then be driven along with the remaining phase drive circuits 103b,c,u,v,w to simulate the missing phase A, with the common connection point 109 and reserve drive circuit 103x providing a reserve current path X to replace that lost by failure of phase A. The rotary electric machine 101 can then be driven in this phase fault mode with a power availability of around 66 percent of that under normal operation. Where p=3, the failed phase takes away 1/(3n) fraction of nominal capacity, whilst another 1/(3n) of the energy fraction needs to be consumed in order to simulate the failed phase and restore balance in the system. The total loss is therefore 2/(3n) which, with n=3, equates to a ⅓ loss of capacity in phase fault mode.

Figure 3:
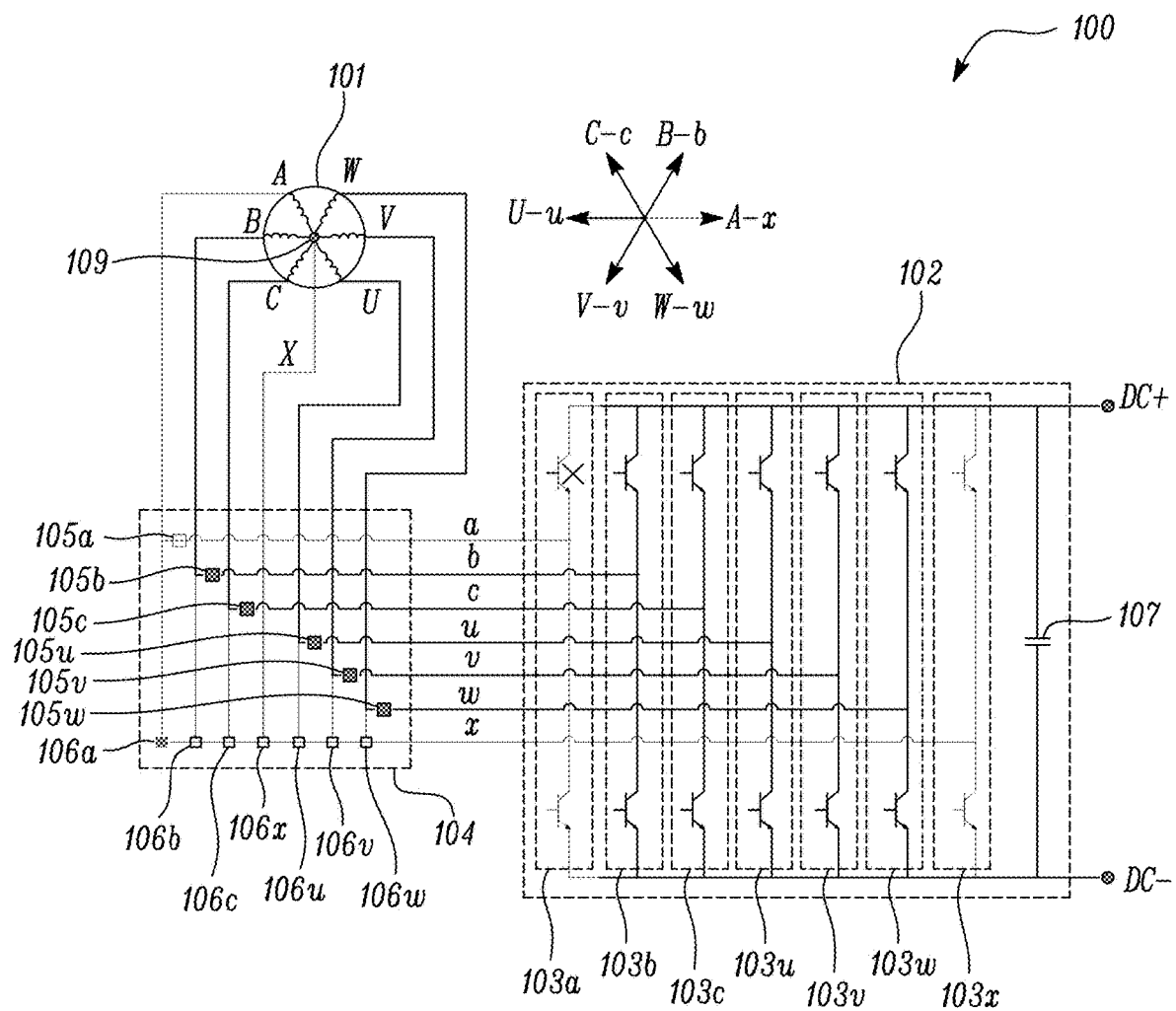
FIG. 3 is a schematic circuit diagram of the electric drive system of FIG. 1 operating in a drive circuit fault mode.

FIG. 3 illustrates the electric drive system 100 in a drive circuit fault mode, in which phase drive circuit 103a has failed. Phase contactor 105a is opened to disconnect the failed phase drive circuit 103a from phase A. In its place, reserve drive circuit 103x is connected to phase A by closing drive circuit fault contactor 106a. The electric drive system 100 can then continue operation in this drive circuit fault mode at full power rating, using reserve drive circuit 103x in place of failed phase drive circuit 103a.

Figure 4:
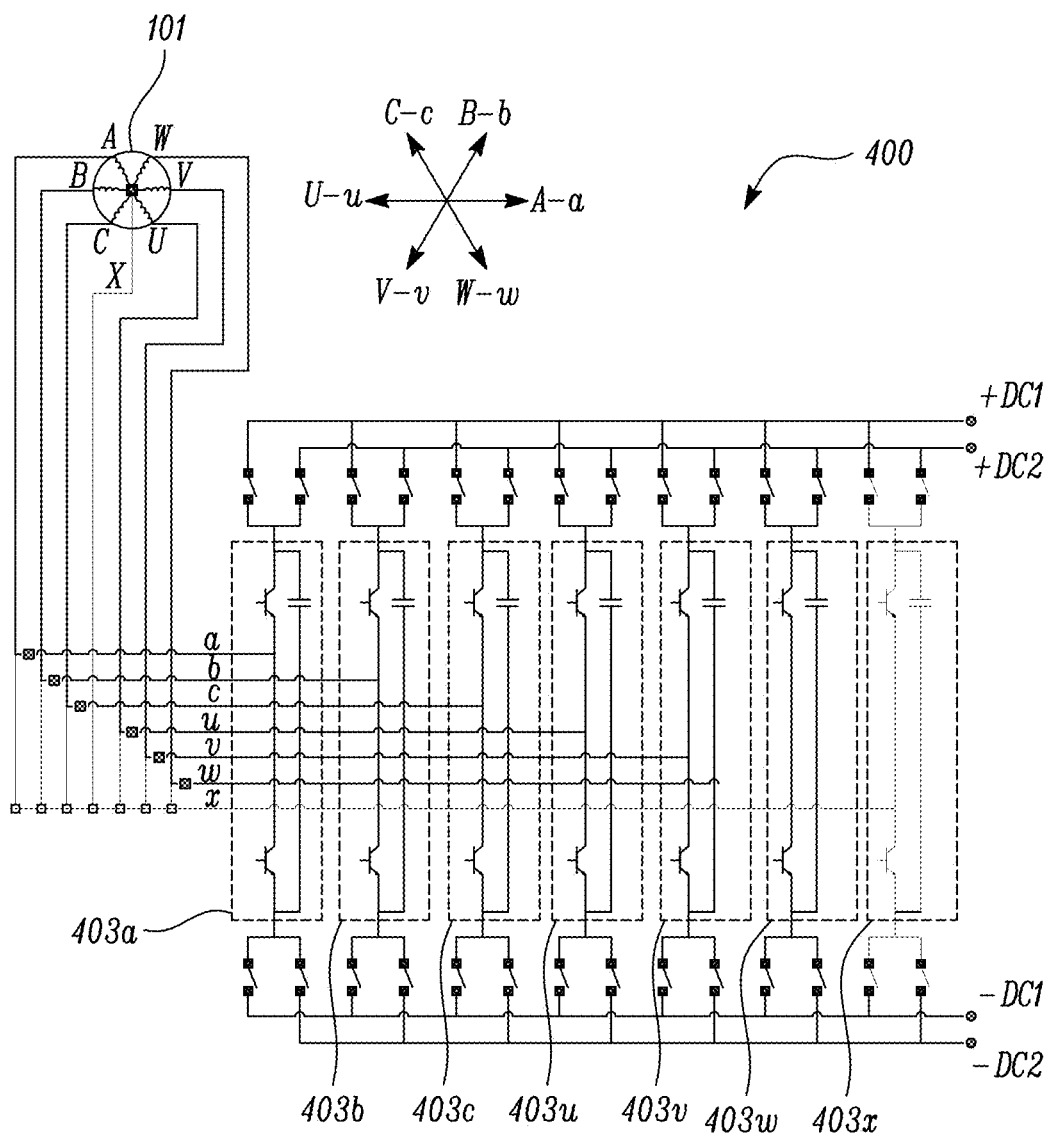
FIG. 4 a schematic circuit diagram of an alternative example fault-tolerant electric drive system.

FIG. 4 illustrates an alternative example electric drive system 400 having most features in common with the examples in FIGS. 1 to 3. In this example system 400, however, each phase drive circuit 403a-c, 403u-w, 403x can be switched between first and second power supplies +/−DC1, +/−DC2, for example to be able to continue operation in case of a fault on a DC bus or to enable operation of the electric machine 101 via different channels that may be at different power levels. In addition, each phase drive circuit comprises a smoothing capacitor connected across the pair of switching elements, which allows the system to be manufactured, maintained and distributed as individual smaller drive modules, which may be replaced individually. The system 400 is otherwise similar to that illustrated in FIG. 1 and described above, with other components having similar functions.

Figure 5:
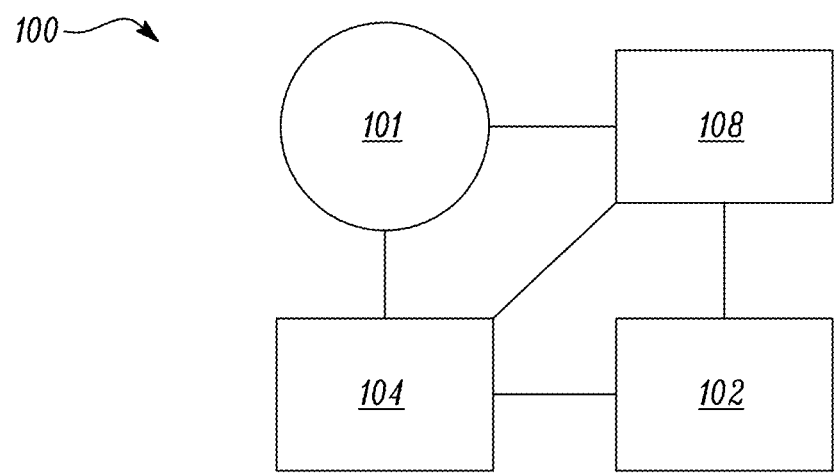
FIG. 5 is a schematic diagram illustrating an example electric drive system in modular form.

FIG. 5 illustrates in schematic modular form an example electric drive system 100 comprising an electric machine 101, a contactor module 104, a drive circuit module 102 and a controller 108. The electric machine 101, contactor module 104 and drive circuit module 102 operate as described above. The controller 108 provides overall control of the drive system 100 by providing inputs to the drive circuit module 102 and contactor module 104 according to the mode of operation, and monitors the drive circuit module 102 and electric machine 101 for faults. Faults in the electric machine 101 may for example be detected by monitoring current through each phase of the machine 101. If a phase fails, the current through the phase will deviate from nominal performance and detection of this may cause the controller 108 to switch operation to a phase fault mode. Faults in the drive circuit module 102 may be detected by detecting whether the switching elements are operating according to a desired switching schedule. A switching state of each element may for example be fed back to the controller and compared with a signal provided to each element. If a switching element is found not to be switching according to the desired switching schedule, the controller 108 may switch operation to a drive circuit fault mode, disconnecting the faulted phase drive circuit and connecting the reserve drive circuit in its place.

Figure 6:
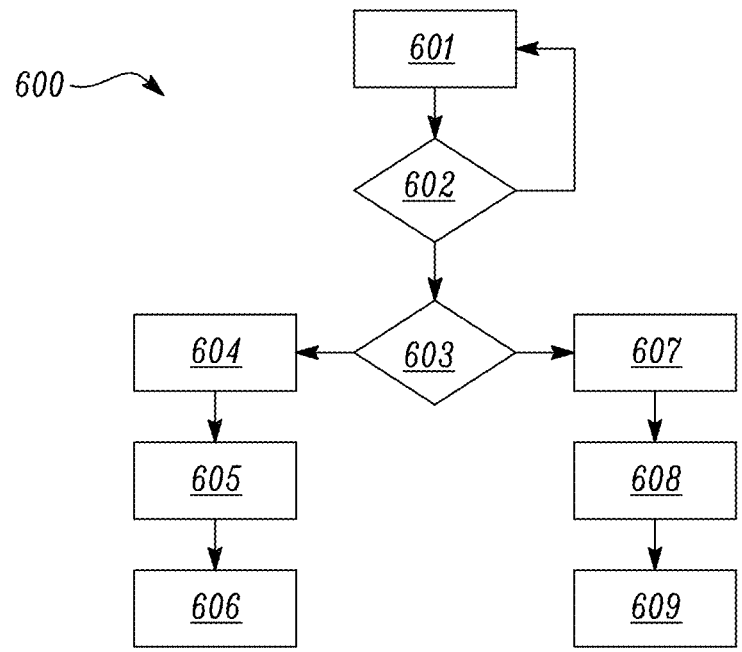
FIG. 6 is a schematic flow diagram illustrating examples modes of operation of an example electric drive system.

FIG. 6 is a schematic flow diagram illustrating operation of the controller 108 of FIG. 5 in normal operation and fault operation. At step 601 the controller 108 provides drive signals to the drive circuit module 102 to operate in a normal mode, and monitors the phases A, B, C, U, V, W and drive circuits 103a-c, 103u-w for faults. At step 602 a check is made for faults in the phases and drive circuits. If no fault is found, the process returns to step 601. In response to finding a fault, the controller 108 determines (step 603) whether the fault is in one of the phases A, B, C, U, V, W or in one of the drive circuits 103a-c, 103u-w. If the fault is in one of the phases, in step 604 the controller 108 opens one of the phase contactors 105a-c, 105u-w in the contactor module 104 to disconnect the faulted phase from its respective drive circuit, and in step 605 closes the reserve switch 106x to connect the reserve drive circuit 103x to the common connection point 109. Operation of the system 100 then continues at step 606 with the controller 108 operating the drive circuit 102 in a phase fault mode. If, at step 603, the controller 108 determines that the fault is in one of the drive circuits 103a-c, 103u-w, at step 607 the phase contactor connecting the faulted drive circuit with its respective phase is opened, disconnecting the faulted drive circuit, and at step 608 the reserve drive circuit 103x is connected to the disconnected phase by closing one of the drive circuit fault contactors 106a-c, 106u-w. Operation of the system then continues at step 609 with the controller 108 operating the driver circuits 103a-c, 103u-w with the reserve drive circuit 103x replacing the faulted drive circuit.

The same principles outlined above will also apply to where the value of n is other than 2. In each case, the electric drive system will be capable of continuing operation, either under a reduced capacity in the case of a faulted phase, or at full capacity in the case of a faulted drive circuit, if one fault occurs. Further reserve drive circuits, each with associated drive circuit fault contactors, may be provided for use in the event of failure of more than one drive circuit, but at the expense of additional redundancy that may in practice be unlikely to be used. Failure of more than one phase may be compensated for in some cases by switching off one set of phases and continuing operation at a reduced power level. In the illustrated examples, phases U, V and W may be switched off if more than one of these phases faults, and operation of the electric machine continued at a 50 percent reduction in capacity. This may applied where p is 2 or more, i.e. where the number of phases is 2n, 3n, 5n, 7n etc.

Referring again to the flow diagram in FIG. 6, if the operation of the controller continues to steps 606 or 609, a fault condition will be indicated and operation of the system should continue only until repair or replacement of the system is possible. In the case of operation of, for example, an electric motor in an aircraft, a fault condition will indicate to the pilot that action should be taken at the earliest opportunity.

It will be understood that the invention is not limited to the embodiments above-described and various modifications and improvements can be made without departing from the concepts herein. Except where mutually exclusive, any of the features may be employed separately or in combination with any other features and the disclosure extends to and includes all combinations and sub-combinations of one or more features described herein.

The invention claimed is:

1. A fault-tolerant electric drive system comprising:
a rotary electric machine comprising pn phases having a common connection point, where p is a prime number and n is an integer greater than or equal to 1;
a drive circuit module having pn phase drive circuits and a reserve drive circuit; and
a contactor module comprising:
pn phase contactors each of which is operable to connect one of the pn phases of the rotary electric machine to a respective one of the pn phase drive circuits; and
a phase fault contactor operable to connect the reserve drive circuit to the common connection point,
the contactor module being configured in a normal operational mode to close each of the pn phase contactors to connect each of the pn phases to a respective one of the pn phase drive circuits,
wherein, in a phase fault mode, in response to a fault in one of the pn phases, hereinafter the faulted phase, the contactor module is configured to open one of the pn phase contactors between the faulted phase and a respective one of the phase drive circuits and to close the phase fault contactor to allow continued operation of the electric drive system.

2. The fault-tolerant electric drive system of claim 1 wherein the contactor module comprises pn drive circuit fault contactors operable to connect the reserve drive circuit to a respective one of the pn phases, wherein in a drive circuit fault mode in response to a fault of one of the pn phase drive circuits, hereinafter the faulted phase drive circuit, the contactor module is configured to open one of the pn phase contactors between the faulted phase drive circuit and a respective one of the phases and to close one of the pn drive circuit fault contactors to connect the reserve drive circuit to the respective one of the phases to allow continued operation of the electric drive system.

3. The fault-tolerant electric drive system according to claim 1, further comprising a controller configured to:
in a normal mode, operate the drive circuit module to cause the pn phase drive circuits to drive operation of the rotary electric machine while the pn phase contactors connect the pn phases of the rotary electric machine to respective ones of the pn phase drive circuits;
monitor the pn phases of the rotary electric machine for a fault; and
in response to detecting a fault in one of the pn phases, hereinafter the faulted phase, operate the drive circuit module in the phase fault mode in which one of the pn phase contactors between the faulted phase and a respective one of the phase drive circuits is opened and the phase fault contactor is closed.

4. The fault-tolerant electric drive system according to claim 1 wherein the drive circuit module is connected between a first pair of power supply rails.

5. The fault-tolerant electric drive system according to claim 4 wherein the drive circuit module is switchable connected between the first pair of power supply rails and a second pair of power supply rails.

6. The fault-tolerant electric drive system according to claim 1 wherein the prime number p is 2, 3, 5 or 7.

7. The fault-tolerant electric drive system according to claim 1 wherein the integer n is 1, 2, 3, 4, or 5.

8. A method of operating a fault-tolerant electric drive system according to claim 1, the method comprising:
in a normal mode, operating the drive circuit module to cause the pn phase drive circuits to drive operation of the rotary electric machine while the pn phase contactors connect the pn phases of the rotary electric machine to respective ones of the pn phase drive circuits;
monitoring the pn phases of the rotary electric machine for a fault;
in response to detecting a fault in one of the pn phases, hereinafter the faulted phase, operating the drive circuit module in a phase fault mode in which one of the pn phase contactors between the faulted phase and a respective one of the phase drive circuits is opened and the phase fault contactor is closed.

9. A controller for a fault-tolerant electric drive system, the controller configured to perform the method according to claim 8.

10. A computer program comprising instructions for instructing a computerised controller for a fault-tolerant electric drive system to perform the method according to claim 8.

* * * * *